Figure 1:
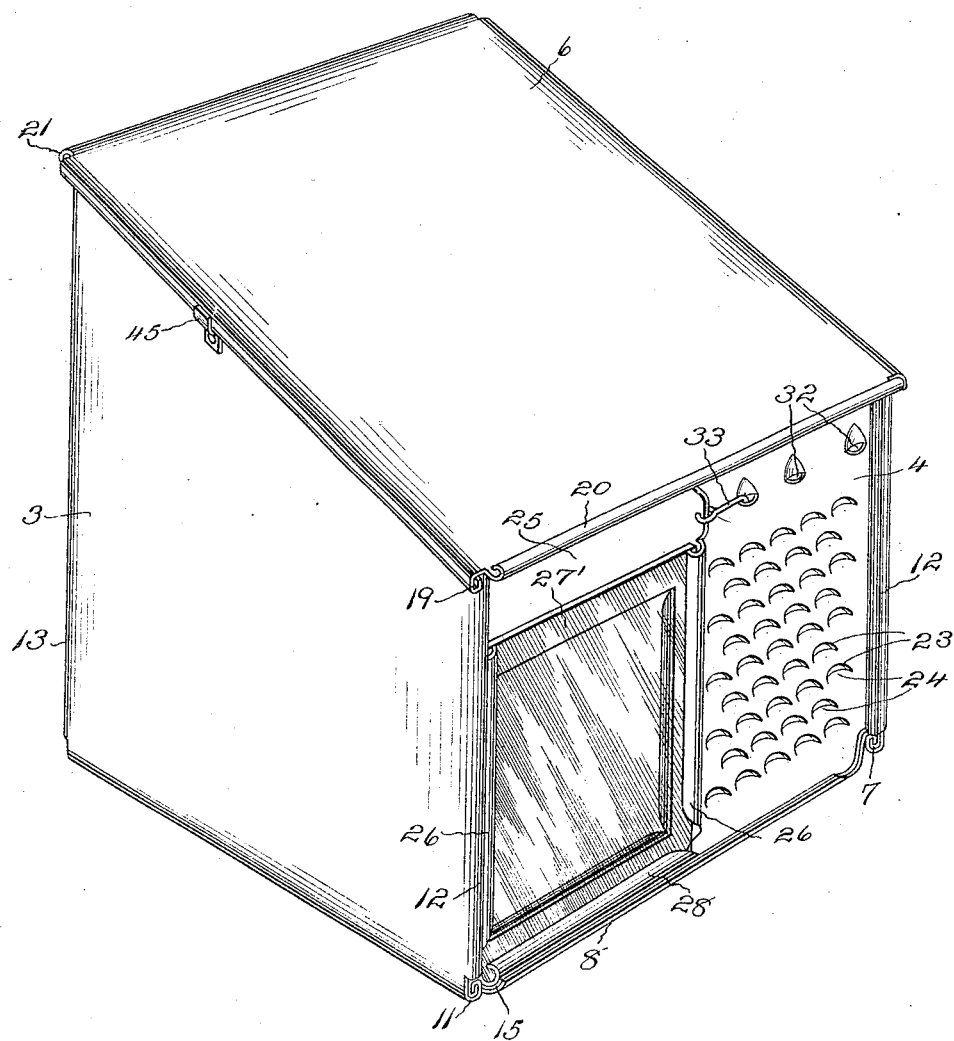

G. B. NORTON.
CHICKEN COOP.
APPLICATION FILED DEC. 7, 1911.
1,051,250.
Patented Jan. 21, 1913.
4 SHEETS—SHEET 2.
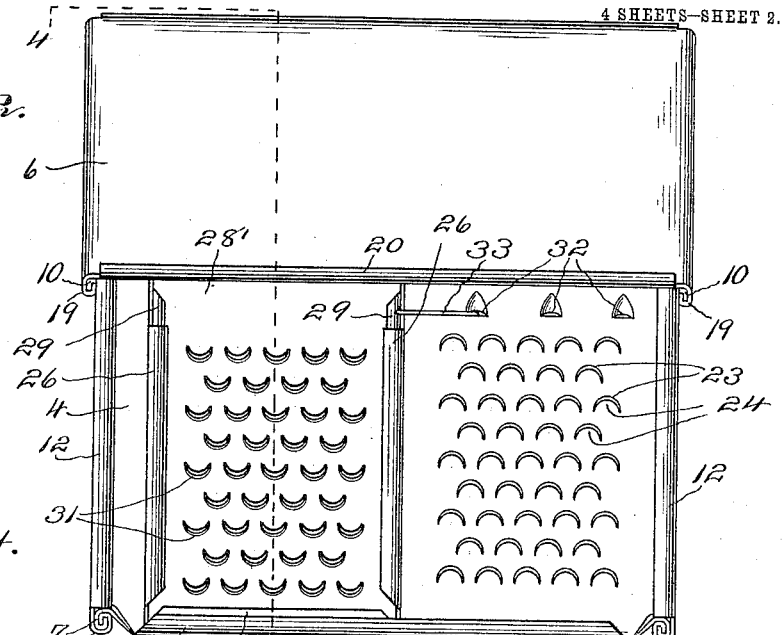
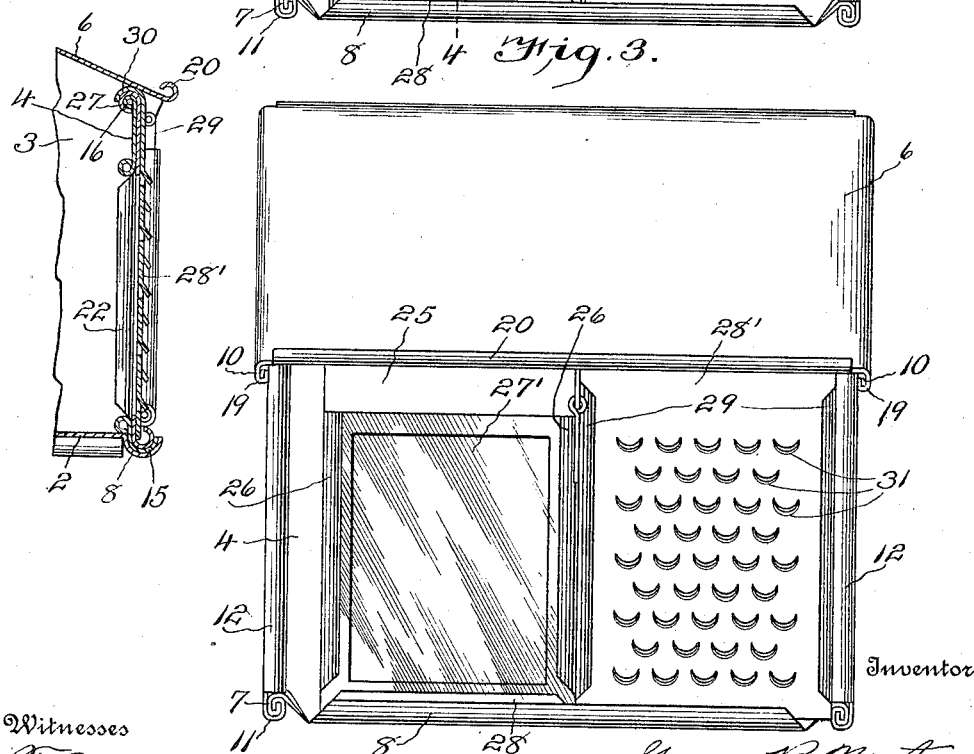
Witnesses
J. P. Britt
E. C. Duffy
Inventor
George B. Norton
By
Attorneys

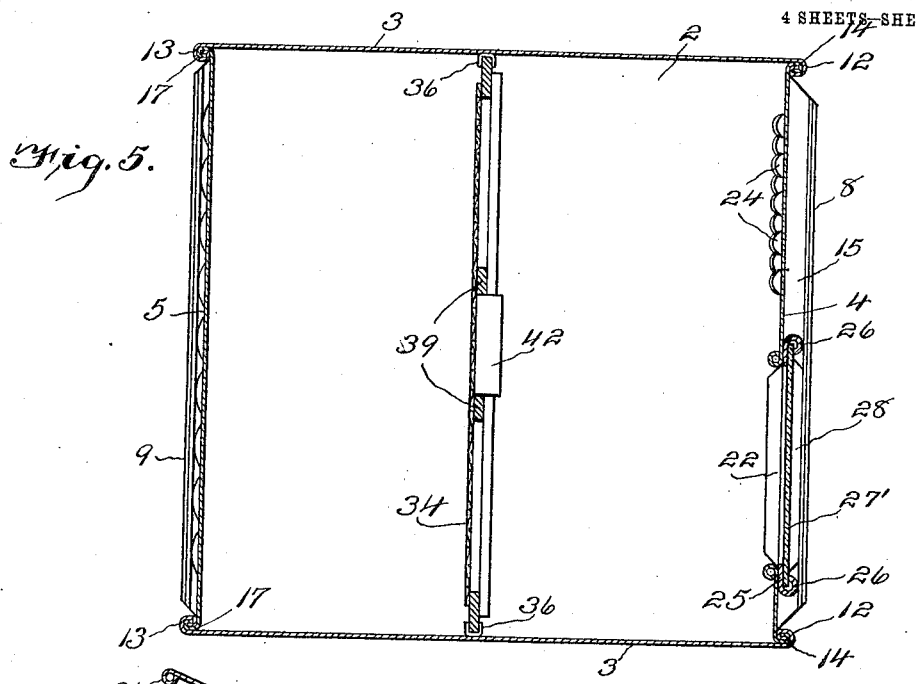
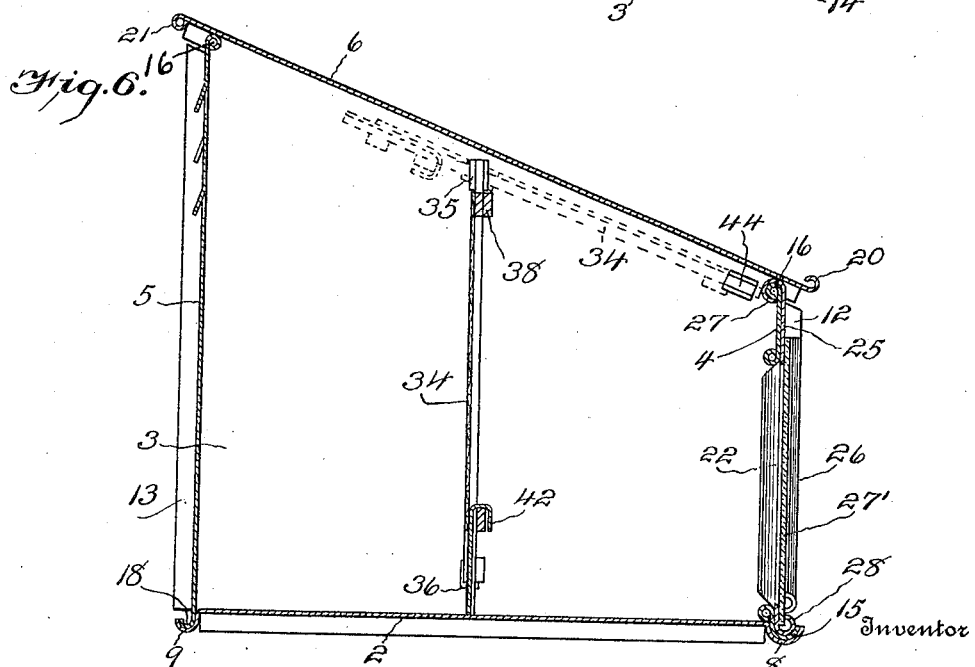

G. B. NORTON.
CHICKEN COOP.
APPLICATION FILED DEC. 7, 1911.
1,051,250.
Patented Jan. 21, 1913.
4 SHEETS—SHEET 4.
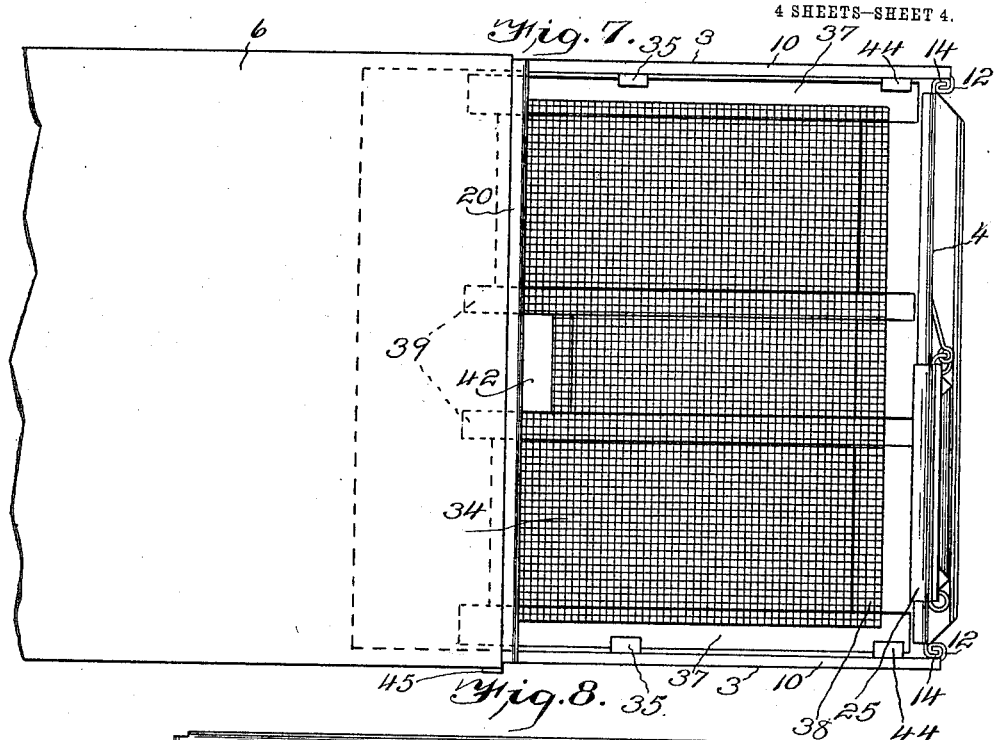
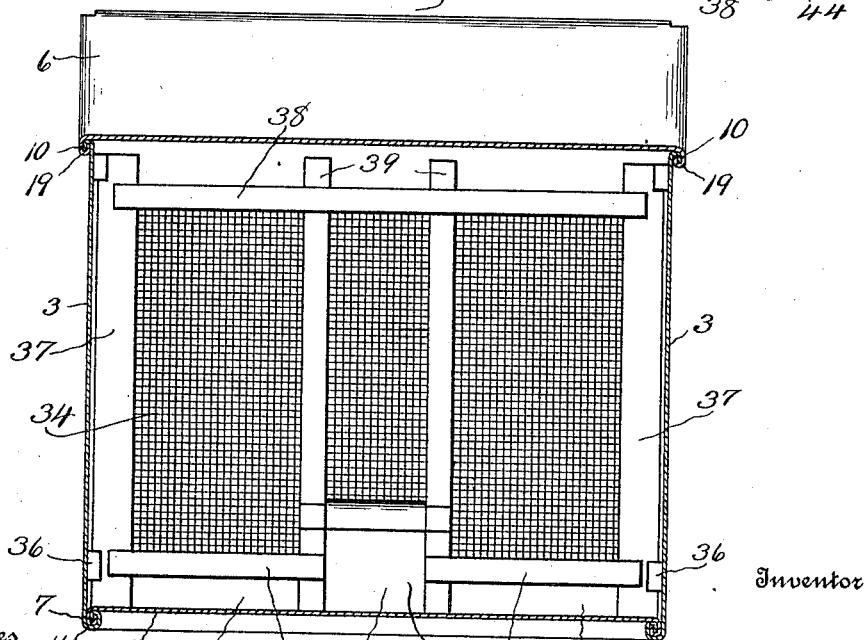

UNITED STATES PATENT OFFICE.

GEORGE BENJAMIN NORTON, OF MORGANFIELD, KENTUCKY.

CHICKEN-COOP.

1,051,250.

Specification of Letters Patent.

Patented Jan. 21, 1913.

Application filed December 7, 1911. Serial No. 664,426.

*To all whom it may concern:*

Be it known that I, GEORGE B. NORTON, a citizen of the United States, residing at Morganfield, in the county of Union and State of Kentucky, have invented certain new and useful Improvements in Chicken-Coops; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to chicken coops, but more particularly to a knock down coop for domestic fowls, and has for its object to provide a device of this class which is so constructed and arranged that the chickens within the coop enjoy free ventilation and sunshine, and which can be quickly and easily caused to protect the chickens in cold or inclement weather.

A further object of the invention is to provide a coop which is sanitary and which can be conveniently cleaned, and knocked down for transportation.

With these and other objects in view, the invention consists in the novel construction of the coop; in the novel arrangement of the central partition; in the construction and arrangement of the door and in certain other novel details of construction and in combinations of parts, all of which will be first fully described and afterward specifically pointed out in the appended claims.

Referring to the accompanying drawings which form a part of this specification: Figure 1. is a perspective view of a chicken coop constructed in accordance with my invention. Fig. 2. a front elevation illustrating door in normal position. Fig. 3. is a similar view showing door in extended position. Fig. 4. is a vertical sectional view through the door on line 4—4 of Fig. 2. Fig. 5. is a horizontal sectional view through the coop. Fig. 6. is a vertical longitudinal sectional view through the coop. Fig. 7. is a top plan view illustrating top in extended position and central partition in raised position, and Fig. 8. is a transverse sectional view showing central partition in normal vertical position.

Like numerals of reference indicate the same parts throughout the several figures in which:

1 indicates the coop which is constructed preferably of sheet metal and comprises the flat bottom 2, sides 3, front 4, back 5 and top 6, the back 5 being of a greater height than the front 4, so as to give to the top 6 of the coop sufficient inclination to shed water. The bottom 2 has its longitudinal edges rolled at 7 (Fig. 8.), and its front and rear edges partially rolled to form transverse grooves or gutters 8 and 9 (Fig. 6.). The sides 3 have their top edges rolled outwardly at 10 (Fig. 2.) and their bottom edges rolled inwardly at 11 (Fig. 2.) to receive the rolled edges 7 of the bottom 2, while the front and rear edges of the sides 3 are rolled inwardly at 12 and 13 (Fig. 5.). The front 4 has its side edges rolled outwardly at 14 (Fig. 5.) and are received by the rolls 12 of the sides and are slidable therein as is apparent from said figure, while the bottom edge of the front is rolled outwardly at 15 and enters the groove or gutter 8 in the front edge of the bottom 2 as shown in Fig. 5, and the top edge of said front 4 is rolled inwardly at 16 as shown in Fig. 6. The back 5 has its side edges rolled outwardly at 17 (Fig. 5.) which operate in the rolled edges 13 of the sides 3 as shown in said figure, while the bottom edge of the back 5 is rolled outwardly at 18 (Fig. 6.) to enter the groove or gutter 9 in the bottom 2, and the top edge of the back is rolled inwardly as shown in said figure. The top 6 has its side edges rolled downwardly at 19 (Fig. 2.) to receive the rolled edges 10 of the sides 3 while the front edge of the top 6 is rolled upwardly at 20 (Fig. 6.) and the rear edge of the top 6 is rolled downwardly at 21 which downward roll 21 acts as a stop against excessive forward movement of the said top 6, as is evident from said figure.

The parts being constructed as described they are assembled in the manner as shown and they can be quickly and easily set up or knocked down as is perfectly apparent, the parts being slidably connected together by means of the interlocking rolled edges as herein described.

Referring now to the specific construction of the front 4, it will be seen from Figs. 5. and 6, that a rectangular opening 22 is formed therein to the left of the center of the said front, while that portion of the front to the right of said opening is provided with a series of inverted and substantially semicircular cuts 23 staggered as shown in Fig. 2, the metal 24 adjacent said cuts or encompassed thereby being bent inwardly beyond the plane of the front proper as shown in Fig. 5.

25 indicates a transversely sliding door which as shown in Figs. 3, 4, 5, and 6 has its side edges rolled outwardly at 26, its top edge rolled inwardly at 27 (Fig. 6.) to engage the rolled top edge 16 of the front 4, and its bottom edge rolled outwardly at 28 (Fig. 6.) to enter the rolled bottom edge 15 of said front, said door 25 being slidable across the front 4 to cover the opening 22 therein or to cover the perforated partition of said front, the said door 25 being provided with an opening therein to conform with and of a size of the opening 22 in the front 4, so that when said door is in position shown in Fig. 3. the opening in the door and the opening 22 in the front register and coincide to form an opening of ingress and egress to and from the coop. I provide a plurality of means for closing said opening according to conditions and the character of the weather. In Fig. 3. I illustrate a glass slide 27' slidable within the rolled edges 26 of the door 25, while in Fig. 2. I illustrate a metallic slide 28' having its side edges rolled outwardly at 29 to slide in the rolled edges 26 of the door 25, the said slide 28' having its top edge rolled inwardly at 30 (Fig. 4.) to hook over the rolled edge of the door 25, the top 6 of the coop, extending over and beyond the said rolled edge 30 of the slide 28 securely locks said slide in position as shown in Fig. 4. The surface of the slide 28 is provided with a series of substantially semicircular cuts 31 staggered as shown, the metal encompassed by said cuts being bent outwardly beyond the plane of the slide 28 as shown in Fig. 4. When the glass slide 27' is being employed in the door 25, the metallic slide 28 can be placed in position shown in said figure which then covers the perforated partition of the front and locks the door 25 against sliding movement. The perforated portion of the front however is provided with a plurality of perforations 32 but preferably three of them as shown in Fig. 2. to receive a hook 33 on the door 25 to fasten said door either in fully or partially closed position for the purpose of affording free or limited access to the coop through the opening 22 in the front thereof.

Referring now to the interior arrangement of the coop, attention is particularly directed to Figs. 5, 6, 7, and 8 in which is illustrated the pivoted and removable partition 34. Arranged on the inner faces of the sides 3 about midway thereof and near their top edges are two pivoted guides 35, and directly under said pivoted guides and near the bottom edges of the sides 3 are two stationary guides 36 within which the partition 34 is freely slidable. The said partition is preferably formed of a suitable mesh wire and comprises the vertical frame pieces 37 the top frame piece 38, the top central frame piece 39, the two bottom frame pieces 40 and the opening 41 (Fig. 8.) over which a suitable door 42 is slidably arranged to open or close said opening 41, a space 43 being provided between the bottom frame pieces 40 of the partition and the floor or bottom 2 of the coop.

When it is desired to form a simple compartment in the coop and to admit the direct rays of the sun thereto, the top or cover 6 is slid back into position shown in Fig. 7. and the partition 34 is raised out of engagement with the lower guides 36, and swung in the pivoted guides 35 into position shown in dotted lines in Fig. 6. and in full lines in Fig. 7. two guides 44 being arranged on the sides 3 near the front edges thereof to receive the said partition as clearly shown. When the partition is in this position the top 6 may be left in the position shown in Fig. 7. or may if desired be returned to its normal position as shown in Fig. 6. To fasten the top 6 in effective position a pivoted fastener 45 on the sides 3 engages the side edges of the top 6 as shown in Fig. 1.

Having thus fully described the construction of the coop its use and operation is apparent to those skilled in the art. It might be said however that in employing the same as a brood coop the mother hen can be maintained on one side of the partition 34 and the chicks allowed free access to both compartments by passing under the said partition 2 while the door 42 can be raised to allow free access to the mother hen or larger fowls from one side of the partition to the other.

Having thus fully described the invention it is of course evident that many slight changes can be made in the construction and arrangement of the parts without departing from the spirit of this invention, and I consider myself clearly entitled to all such changes and modifications as fall within the limit and scope of the appended claims.

I claim—

1. A coop of the character described comprising bottom, sides, ends and top, the said coop being provided with a closable opening for ingress and egress to and from the coop, a transverse partition within the said coop, a closable opening in said transverse partition, pivoted guides in the sides of the coop for pivoting said transverse partition, said transverse partition being slidable in said pivoted guides, stationary guides arranged in the sides of the coop to receive said transverse partition, stationary guides arranged in the sides of the coop near the top edges thereof to receive the said transverse partition when the same is swung out of its vertical normal operative position, the whole being arranged in such manner that the said transverse partition is swung on the said pivoted guides out of its vertical operative position, substantially as described and for the purposes set forth.

2. A coop of the character described having therein a closable opening to afford ingress and egress to and from the coop, a transverse partition within the said coop to divide the interior thereof into two compartments, a closable opening in the said transverse partition to open communication between the said two compartments therethrough, pivoted guides in said coop upon which said transverse partition is operated, said transverse partition being slidable in said pivoted guides, stationary guides in said coop near the top thereof to receive the said transverse partition when it is swung on said pivoted guides out of its normal vertical position in such manner as to form the coop into a single compartment, substantially as described.

3. A coop of the character described comprising a closable opening to afford ingress and egress to and from the coop, a partition within the said coop arranged to divide the same into two compartments, said partition being provided with a closable opening to effect communication between the two compartments, the said partition being provided with a relatively small opening therein for effecting communication between the two compartments at all times, pivoted guides arranged in the coop for pivoting the said partition, the said partition being slidable within the said pivoted guides, and means for retaining the said partition out of its normal vertical position when the same is swung on the said pivoted guides to form a single compartment of the coop, substantially as described.

In testimony whereof, I affix my signature, in presence of two witnesses.

GEORGE BENJAMIN NORTON.

Witnesses:
G. L. DRURY,
MARY DELANEY.

Copies of this patent may be obtained for five cents each, by addressing the "Commissioner of Patents. Washington, D. C."